July 10, 1934.    C. E. STEERÉ    1,966,147
DOUGH DIVIDER
Filed April 10, 1933    2 Sheets-Sheet 2
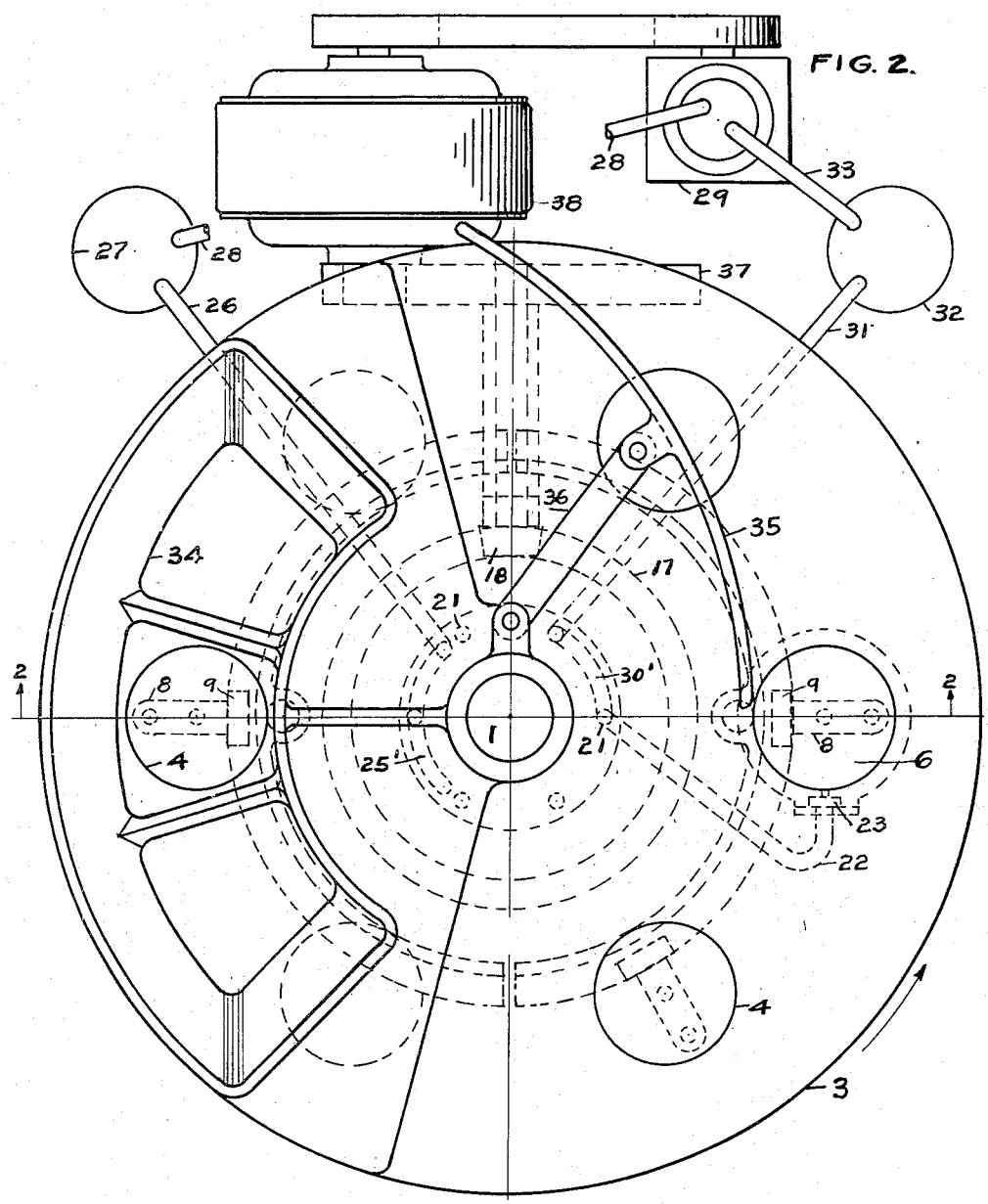
INVENTOR.
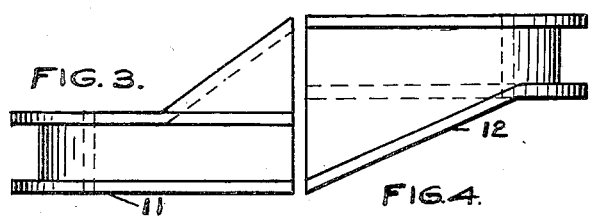
Clarence E. Steere.

Patented July 10, 1934

1,966,147

UNITED STATES PATENT OFFICE 1,966,147

DOUGH DIVIDER

Clarence E. Steeré, Los Angeles, Calif.

Application April 10, 1933, Serial No. 665,315

3 Claims. (Cl. 107—15)

This invention relates to a dough divider, whereby a mass of dough is subdivided into the correct sizes suitable for baking. In dough dividers now in use, the dough is compressed into measuring chambers by pressure, thereby injuring the dough, breaking the water cells, and retarding the fermenting action of the yeast, so that an excess of yeast is necessary.

An object of my invention is to divide dough into the correct weights without compression by means of a vacuum measuring chamber.

A further object is to provide a dough divider of the character stated which will rapidly and accurately divide the dough and to provide a device which is simple, durable in construction.

Another object of my invention is to provide novel means for adjusting the capacity of the dough measuring chamber while the machine is in operation.

Other objects and features of invention may appear from the accompanying drawings, the subjoined detailed description, and the appended claims.

In the drawings

Fig. 2 is a plan view of my machine.

Fig. 3 is a side view of the adjustable cam track.

Fig. 4 is a side view of the fixed cam track.

Figure 1:
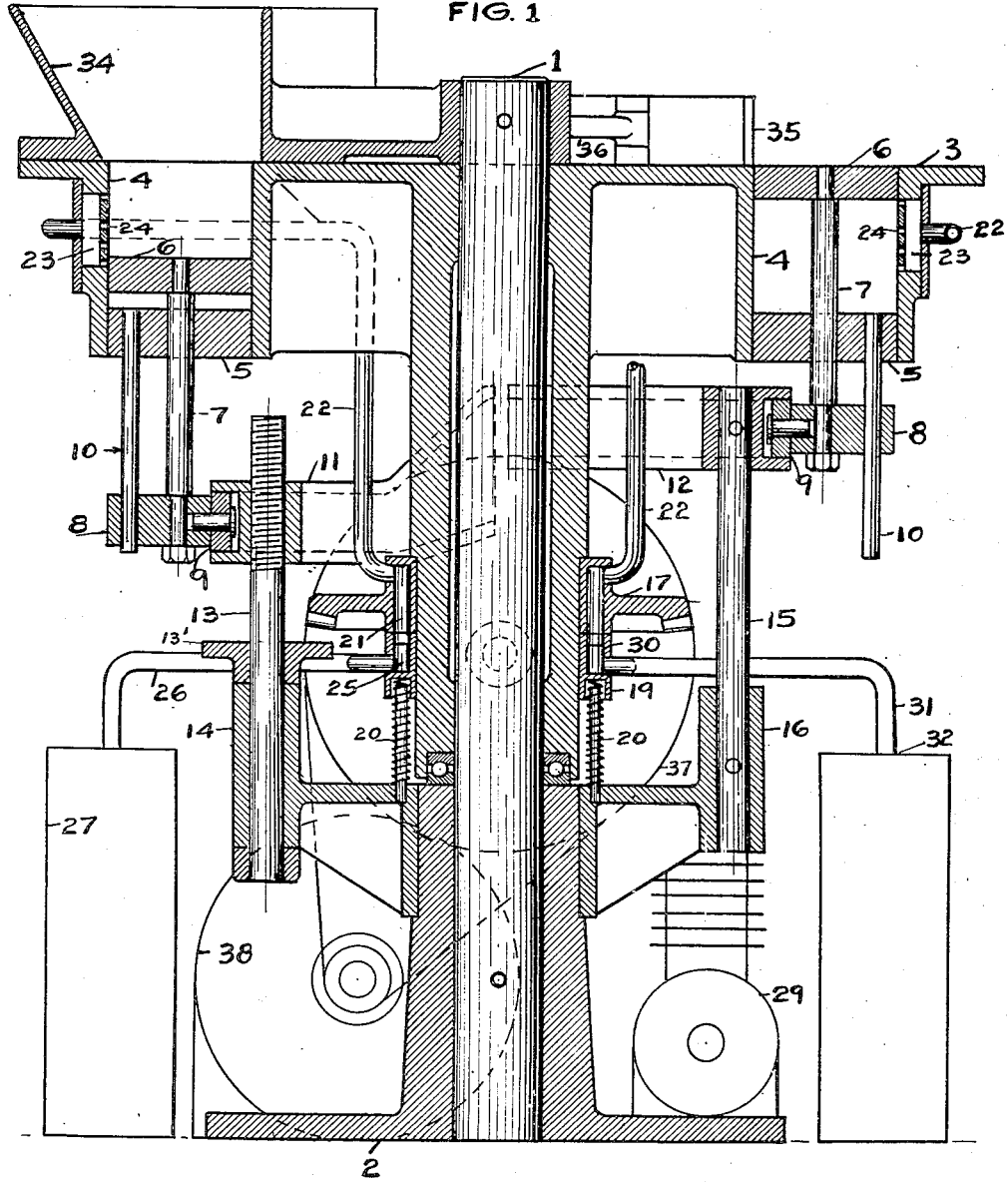
Fig. 1 is a horizontal section on the line 2—2 of Fig. 2.

Referring to the drawings, my machine comprises the post 1 fixed in the pedestal 2. Revolvably mounted on the post 1 is the horizontal circular table or disc 3. Table 3 carries a multiplicity of evenly spaced cylinders 4, projecting downwardly from table 3. These cylinders are open on the upper end and closed on the bottom end by head 5, and make a dough measuring chamber. A piston 6 is reciprocally mounted in each cylinder. The pistons are slightly smaller than the cylinders so that air may flow between the piston and cylinder. A pitman 7 extends downwardly from each piston through head 5, and is attached to crosshead 8. Roller 9 is carried by crosshead 8. A guide pin 10 extends through crosshead 8 to prevent a swinging motion. Roller 9 runs in adjustable cam track 11 and fixed cam track 12. Cam track 11 is mounted on screw 13, which is revolvably housed in bracket 14. Cam track 13 is fixed to pin 15, which is rigidly held by bracket 16. Brackets 14 and 16 are rigidly attached to pedestal 2.

Fixed to table 3 is bevel gear 17, meshing with pinion 18, shown in dotted lines on Fig. 2. The lower face of the hub on gear 17 lies against ring 19, which is kept from revolving by springs 20, said springs also keeping ring 19 firmly pressed against gear 17. A hole 21 leads from the face of gear 17 to pipe 22, which connects a space 23 in the side of cylinder 4, there being a hole and pipe for each cylinder. Space 23 has holes 24 leading into cylinder 4. Ring 19 has two holes connecting with slots on the same radius as the holes in gear 17. Hole 25 in ring 19 is connected to pipe 26 leading to vacuum tank 27, which is connected by pipe 28 to vacuum pump 29. Hole 30 in ring 19 is connected by pipe 31 to pressure tank 32, which is connected by pipe 33 to the exhaust side of vacuum pump 29. Hub of gear 17 and ring 19 make a valve.

Mounted on the upper side of table 3 is dough hopper 34, which lies freely spaced from table 3, and is rigidly mounted on post 1. Dough hopper 34 is open on the bottom side to cover an arc equal to the spacing of the cylinders in table 3 plus the diameter of a cylinder. A scraper blade 35 lies on table 3, said blade 35 being kept in position by arm 36 connected to hopper 34.

Pulley 37 is connected to pinion 18 and is belted to double-end motor 38, which motor also drives pump 29.

In operation, table 3 revolves under hopper 34, containing dough. As cylinder 4 comes under the opening in hopper 34, hole 21 commences to agree with slot 25', Fig. 2, and hence a vacuum is created in cylinder 4, which vacuum continues until hole 21 has passed from slot 25'. If there is dough in the hopper it will be drawn into cylinder 4 by the vacuum.

Inasmuch as roller 9 will follow cam track 11, if such cam track is raised or lowered by screw 13, the position of piston 6 in cylinder 4 will vary accordingly and the volume of cylinder 4 above piston 6 can be adjusted to the correct amount, and this adjustment can be made when the machine is in operation by turning screw 13 by means of hand wheel 13' which is rigidly attached to screw 13. Roller 9 will pass from cam track 11, irrespective of the position of said cam track within the limits of its movement, into cam track 12, by reason of the sloping lower cam track side of cam track 12, as shown in Fig. 4. Said cam track 12 is rigidly set so that when roller has been carried to its upper position, piston 6 will be flush with table 3.

Roller 9 will pass from cam track 12 into cam track 11, by a similar sloping side of cam track 11, as shown in Fig. 3, bringing the piston 6 to the required position, as described.

When piston 6 is flush with table 3, hole 21 will commence to agree with slot 30' in ring 19, as shown in Fig. 2, and hence the air drawn by the vacuum pump will be discharged around the space between the piston 6 and cylinder 4.

When piston 6 is flush with table 3 a continuous plane surface is formed. The dough which has been drawn into cylinder 4 by the vacuum rests on the face of piston 6. The revolving action of table 3 carries the dough against scraper blade 35, causing a spinning motion in the dough and rounding it into a ball. This spinning action continues until the dough drops off the edge of table 3 onto a conveyor not shown in the drawings.

Having described my invention, I claim:

1. A dough divider comprising a stationary hopper, a horizontal disc revolvably mounted under and adjacent to said hopper, the disc having a plurality of cylinders, a piston in each cylinder, means to reciprocate said pistons, means to adjust the amount of reciprocation, means to evacuate said cylinders when they are successively carried from under said hopper, and means to exert a pressure on each cylinder when it passes from said hopper.

2. A dough divider comprising a stationary hopper, a horizontal disc carrying cylinders revolving under said hopper, pistons in said cylinders, means to reciprocate said pistons, means to adjust the amount of reciprocation, means to evacuate said cylinders, a stationary scraper blade in contact with the face of the disk and lying diagonally across the path of the cylinders and means to exert a pressure in each cylinder when carried away from said hopper by the revolving motion of said disc.

3. In a dough divider the combination of a vertical post, a circular table revolvably mounted on said post, a stationary hopper above the table, dough measuring chambers carried by said table, means to adjust the volume of such measuring chambers, means to evacuate such measuring chambers when in juxtaposition with said hopper, means to exert a pressure in said measuring chambers when carried away from the hopper, pistons in said measuring chambers, means to bring the pistons flush with the table, thereby ejecting the dough from the measuring chambers, a scraper blade engaging the upper face of the table, said scraper blade deflecting the dough off the table and simultaneously rounding the dough into a ball.

CLARENCE E. STEERE.